(12) United States Patent
Sprague

(10) Patent No.: US 9,932,246 B2
(45) Date of Patent: Apr. 3, 2018

(54) PULSE CAVITATION PROCESSOR AND METHOD OF USING SAME

(71) Applicant: Fluid-Quip, Inc., Springfield, OH (US)

(72) Inventor: Allison Sprague, Prescott (CA)

(73) Assignee: Fluid-Quip, Inc., Springfield, OH (US)

( * ) Notice: Subject to any disclaimer, the term of this patent is extended or adjusted under 35 U.S.C. 154(b) by 809 days.

(21) Appl. No.: 14/209,025

(22) Filed: Mar. 13, 2014

(65) Prior Publication Data
US 2014/0263093 A1 Sep. 18, 2014

Related U.S. Application Data

(60) Provisional application No. 61/786,958, filed on Mar. 15, 2013.

(51) Int. Cl.
*C02F 1/34* (2006.01)
*B01J 19/00* (2006.01)
*B01J 19/26* (2006.01)

(52) U.S. Cl.
CPC ............... *C02F 1/34* (2013.01); *B01J 19/008* (2013.01); *B01J 19/26* (2013.01)

(58) Field of Classification Search
CPC .......... B01J 19/00; B01J 19/008; B01J 19/26; B05B 1/30; C02F 9/00; C02F 1/34; C02F 1/32; C02F 1/20; C02F 3/12; F15D 1/00; F15D 1/02
See application file for complete search history.

(56) References Cited

U.S. PATENT DOCUMENTS

| 4,644,974 A | 2/1987 | Zingg |
| 5,326,468 A * | 7/1994 | Cox ..................... B01F 5/0646 138/45 |

(Continued)

OTHER PUBLICATIONS

Lesko, Timothy M., "Chemical Effects of Acoustic Cavitation," Doctorate Thesis for California Institute of Technology, Pasadena, CA, (Apr. 2004) (198 pages).

(Continued)

*Primary Examiner* — Walter D. Griffin
*Assistant Examiner* — Cameron J Allen
(74) *Attorney, Agent, or Firm* — Wood Herron & Evans LLP

(57) ABSTRACT

A liquid treatment apparatus includes a supply chamber for receiving a fluid, a discharge chamber for discharging the fluid, and a cavitation generating chamber extending from the supply chamber to the discharge chamber. The cavitation generating chamber is operable to generate cavitation bubbles. A method of treating a liquid comprises directing a fluid from a supply chamber into a cavitation generating chamber by constricting the fluid through an orifice, wherein the orifice has a cross dimension that is substantially less than a cross dimension of the supply chamber, such that a fluid jet is formed. The method further includes allowing the fluid jet to expand downstream of the orifice such that the velocity of the fluid is reduced so that the jet axial velocity head at the chamber outlet is less than the difference between the static pressure within the discharge chamber and the vapor pressure of the fluid. The method also includes discharging the fluid into a discharge chamber via a chamber outlet.

13 Claims, 6 Drawing Sheets

(56) References Cited

U.S. PATENT DOCUMENTS

| | | | |
|---|---|---|---|
| 5,519,670 A * | 5/1996 | Walter | B01J 19/008 210/188 |
| 6,042,089 A | 3/2000 | Klein | |
| 2008/0099410 A1* | 5/2008 | Sprague | B01J 19/008 210/787 |
| 2010/0012049 A1 | 1/2010 | Pless | |
| 2014/0346108 A1* | 11/2014 | Josse | C02F 1/20 210/605 |

OTHER PUBLICATIONS

Chahine, G.L., "Pressures Generated by a Bubble Cloud Collapse," Chemical Engineering Communications, vol. 28, pp. 355-367, (1984) (13 pages).

Suslick, Kenneth S., et al., "Chemistry Induced by Hydrodynamic Cavitation," Journal of the American Chemical Society, vol. 119, pp. 9303-9304, (1997) (2 pages).

Kalumuck, K. M., et al., "Remediation and Disinfection of Water Using Jet Generated Cavitation," Fifth International Symposium on Cavitation (CAV2003), Osaka, Japan, (Nov. 1-4, 2003) (8 pages).

Sharma, Amit M., et al., "Modeling of Hydrodynamic Cavitation Reactors Based on Orifice Plates Considering Hydrodynamics and Chemical Reactions Occurring in Bubble," Chemical Engineering Journal 143, pp. 201-209, (2008) (9 pages).

Suslick, Kenneth S., "The Chemical Effects of Ultrasound," Scientific American, pp. 80-86, (Feb. 1989) (7 pages).

Suslick, Kenneth S., et al., "Acoustic Cavitation and Its Chemical Consequences," Philosophical Transactions of the Royal Society London A, Great Britain, vol. 357, pp. 335-353 (1999) (20 pages).

Konno, A., et al., "On the Collapsing Behavior of Cavitation Bubble Clusters," Fourth International Symposium on Cavitation (CAV2001), Session A8.003, California Institute of Technology, Pasadena, CA (Jun. 20-23, 2001) (8 pages).

Neis, U., et al., "Ultrasonic Disinfection of Wastewater Effluents for High-Quality Reuse," IWA Regional Symposium on Water Recycling in Mediterranean Region, Iraklio, Greece, (Sep. 26-29, 2002) (8 pages).

Peters, M.C.A.M., et al., "Damping and Reflection Coefficient Measurements for an Open Pipe at Low Mach and Low Helmholtz Numbers," Journal of Fluid Mechanics, vol. 256, pp. 499-534, (1993) (36 pages).

Benoit Chushman-Roisin, "Chapter 9, Turbulent Jets," Environmental Fluid Mechanics, Dartmouth College, Thayer School of Engineering, pp. 153-161, (Mar. 2014) (9 pages).

Beatove, Santiago Lain, "Dispersion de Particulars Solidas en Flujos Bifasicos Turbulentos de Interes Industrial," Ingenieria y Desarrollo: Revista de la Division de Ingenieria de la Universidad del Norte, ISSN 0122-3461, No. 17, pp. 87-114 (2005) (28 pages). English Abstract Included.

Brennen, Christopher Earls, "Cavitation and Bubble Dynamics," California Institute of Technology, Oxford University Press, New York, ISBN 0-19-509409-3 (1995) (254 pages).

University of New South Wales, Australia, "Acoustic Compliance, Inertance and Impedance," retrieved from http://www.animations.physics.unsw.edu.au/jw/compliance-inertance-impedance.htm on Mar. 8, 2013. (4 pages).

The United States Patent and Trademark Office, International Search Report and Written Opinion in corresponding International Patent Application No. PCT/US2014/25276, dated Jul. 3, 2014 (11 pages).

* cited by examiner

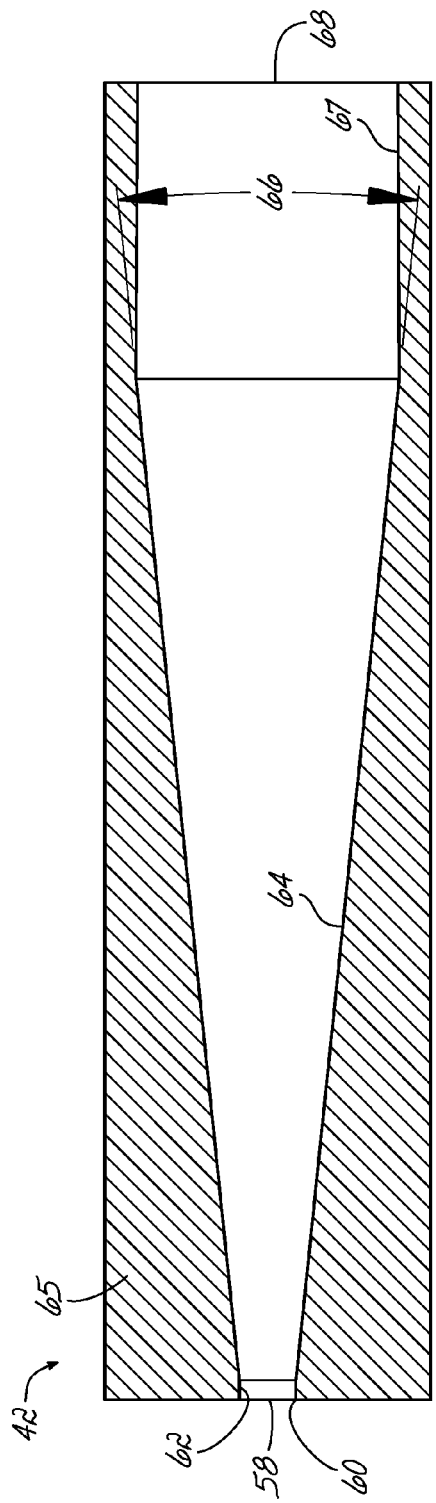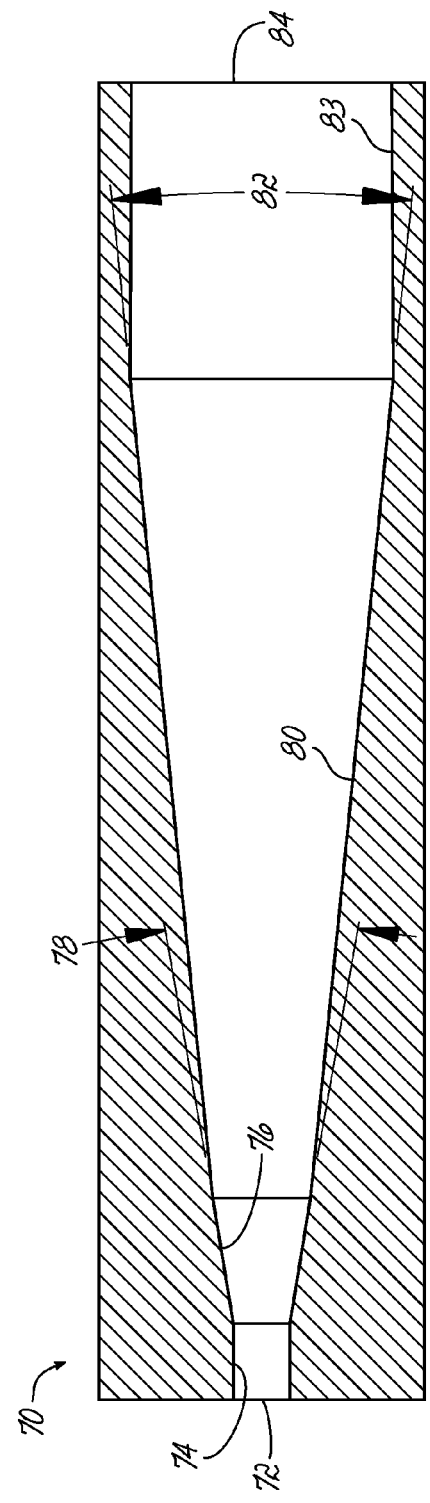
FIG. 4A
FIG. 4B

PULSE CAVITATION PROCESSOR AND METHOD OF USING SAME

CROSS-REFERENCE TO RELATED APPLICATION

This application claims the benefit of U.S. Provisional Patent Application Ser. No. 61/786,958, filed Mar. 15, 2013, the disclosure of which is expressly incorporated by reference herein in its entirety.

TECHNICAL FIELD

The invention relates to a liquid treatment apparatus for treating a liquid medium and, more particularly, to an apparatus and method for enhancing chemical reactions occurring in processes utilizing hydrodynamic cavitation.

BACKGROUND

Cavitation is the formation and implosion or collapse of cavities, or bubbles, in a liquid that are the consequence of forces acting upon the liquid. Cavitation usually occurs when the local pressure within a liquid is reduced to less than the vapor pressure of the liquid.

Many industrial processes rely on various chemical reactions in a liquid medium to achieve a certain end product. Accordingly, manufacturers and others that perform these industrial processes continually seek improvements to these processes so as to improve their efficiency and provide a cost benefit. By way of example, increasing the efficiency in chemical reactions occurring in a liquid medium may result in a decrease in processing time, which may lead to an increase in overall production and decrease in operating costs, and/or a decrease in chemical consumption in the liquid medium for achieving the desired result which may reduce operating costs. These are only exemplary and, depending on the specific application, many other benefits may be gained by improving the efficiency of various chemical reactions.

There are numerous industrial applications that may benefit from improved chemical reactions using cavitation. For example, the use of cavitation in the treatment of contaminated water, e.g., wastewater, is documented. In these cavitation methods, the goal is to generate many fine bubbles, which upon their implosion create intense, but highly localized temperatures and pressures. This energy release then causes dissolution of the water molecules and the creation of free hydroxyl radicals. The potential of these powerful radicals for the beneficial treatment of the water has been well recognized for many years. However, the inefficiencies in the known processes for generating cavitation within a liquid (e.g., ultrasonic, spinning impeller, or jet cavitation) have limited commercial acceptance of cavitation.

It should be noted that in cavitation, the process of generating bubbles is often considered secondary in importance to the subsequent process of collapsing the bubbles, since it is the collapse which produces the effecting high temperatures and pressures. More intense bubble collapse results in higher temperatures and allows more energetic bonds to be broken. This increases the ability of the cavitation process to kill microorganisms and separate particulate matter, such as breaking bonds between or within molecules. Maximum bubble collapse temperatures and pressures are achieved by maximizing bubble collapse velocities.

Preferably, in order to maximize effectiveness, bubbles collapse in rapid succession in a process referred to as cavitation cloud collapse, generating high amplitude/frequency pressure waves which can be used to generate high pressure differentials around and across the bubbles. Cavitation cloud collapse can generate pressures that are orders of magnitude higher than those produced by single bubble collapse. However, this synchronization is difficult to achieve. When an individual bubble collapses under uniform ambient pressure, the collapse rate is restrained due to the inertia of the surrounding fluid. Following collapse, a pressure wave is generated which radiates energy spherically outward from its center. The amplitude of the pressure wave is reduced as a function of the square of the distance from the center of the bubble collapse, such that the amplitude decreases relatively rapidly. If several bubbles collapse in a random manner, pressure waves generated from these collapses impact upon other bubbles in a random manner. The amplitudes of the resulting pressure waves will also vary in a random manner. Due to the random nature of these pressure waves, cavitation cloud collapse will not be initiated, and maximum bubble collapse temperatures and pressures will not be achieved. However, if a uniform, coherent, high frequency pressure wave encounters a cloud of bubbles, then the increase in differential pressure applied to the bubbles will tend to cause the bubbles to collapse in the direction of the pressure wave, such that the energy from the bubble collapses will be added to the original pressure wave, increasing its amplitude. This will tend to increase the amplitude of the individual pressure pulses generated by successive bubble collapses, and will also tend to increase the frequency of these pressure pulses.

When uncontrolled, hydrodynamic cavitation can be very damaging. Studies have shown that cloud collapse can be more violent than collapse of individual bubbles. Typically, the damage is most severe on solid surfaces close to the location of the cloud collapse. Shock waves formed by clouds of cavitation bubbles that implode on or near a metal surface can cause cyclic stress through repeated implosion, resulting in surface fatigue of the metal. As a result, leaks can eventually form in the walls of a device in which cloud cavitation occurs. Therefore, the implosion of cavitation bubble clouds must be controlled in order to harness their energy and reduce or eliminate damage to the surrounding walls.

A wide variety of cavitation generators exist in the prior art. For example, U.S. Pat. No. 4,474,251 to Virgil E. Johnson, Jr. describes an acoustic-hydrodynamic resonator which may utilize an organ-pipe oscillator in conjunction with a Helmholtz resonator chamber to produce a pulsed liquid jet for eroding a solid surface. In one embodiment, liquid is directed through a first orifice and a jet is formed by directing the liquid through a second orifice, and the jet is pulsed by oscillating the pressure of the liquid after it exits the first orifice through hydrodynamic and acoustic interactions. Typically, a Helmholtz chamber is formed between the first and second orifices, wherein the pressure of the liquid is oscillated within the Helmholtz chamber, and a portion of the energy of the high velocity liquid is utilized to pulse the liquid. The cavitation bubble collapse occurs within the discharge stream and not within the device. The device in the '251 patent may be termed a pure fluid device since it is entirely passive and requires no outside energy supply. The energy for its operation comes only from the fluid and it depends on hydrodynamic and acoustic interactions for its operation. In addition, several hydrodynamic cavitation generators have been invented by Oleg V. Kozyuk and others.

However, none of these devices adequately generate cavitation bubble cloud collapse, and in particular, capture and utilize residual pressure wave energy to enhance formation and collapse of subsequent cavitation bubble clouds.

It is therefore an object of the present invention to provide a cavitation generator which maximizes the utilization of fluid energy for cavitation bubble formation and which maximizes the temperatures and pressures generated during bubble collapse.

SUMMARY

A liquid treatment apparatus includes a supply chamber for receiving a fluid, a discharge chamber for discharging the fluid, and a cavitation generating chamber extending from a position on the supply chamber to a position on the discharge chamber for providing a fluid path therebetween. The cavitation generating chamber is operable to generate cavitation bubbles. The cavitation generating chamber includes an orifice positioned downstream of the supply chamber, wherein the orifice has a cross dimension that is substantially less than a cross dimension of the supply chamber for providing a fluid constriction. The cavitation generating chamber further includes a first expansion chamber positioned downstream of the orifice and a chamber outlet positioned downstream of the expansion chamber.

In one embodiment, a cross dimension of the supply chamber may be substantially greater than a cross dimension of the orifice to provide reflection at or near the orifice of pressure waves generated within the cavitation generating chamber. For example, the cross dimension of the supply chamber may be at least twice the cross dimension of the orifice. Similarly, in another embodiment a cross dimension of the discharge chamber is substantially greater than a cross dimension of the chamber outlet to provide reflection at the chamber outlet of pressure waves generated within the cavitation generating chamber. For example, the cross dimension of the discharge chamber may be at least twice the cross dimension of the chamber outlet. By reflecting the pressure waves at the orifice and/or chamber outlet, a significant portion of the energy is retained within the device. This energy can be utilized to increase the intensity of cloud cavitation bubble collapse within the device.

In one embodiment, a cross dimension of the supply chamber may be at least twice a cross dimension of the orifice. For example, the cross dimension of the supply chamber may be substantially equal to about four times the cross dimension of the orifice. In one embodiment, the orifice is defined by a sharp edge of the cavitation generating chamber. However, in an alternative embodiment, the orifice is defined by a rounded edge of the cavitation generating chamber.

In another embodiment, the first expansion chamber comprises a first angle of expansion that is substantially equal to or slightly less than a natural angle of expansion of a turbulent fluid jet immersed in a fluid of substantially the same density, i.e. approximately 11.8 degrees per side (or approximately 23.6 degrees overall). At this angle, the Reynolds number of an immersed jet may vary little with distance from the origin. In one embodiment, the first expansion chamber comprises a first angle of expansion that is not less than about 10 degrees. For example, the first expansion chamber may comprise a first angle of expansion that is substantially equal to about 20 degrees. Alternatively, the first expansion chamber may comprise a first angle of expansion that is substantially equal to about 30 degrees.

In another embodiment, the liquid treatment apparatus further comprises at least one second cavitation generating chamber extending from a position on the supply chamber to a position on the discharge chamber for providing a fluid flow path therebetween. The at least one second cavitation generating chamber is operable to generate cavitation bubbles. The cavitation generating chamber comprises an orifice positioned downstream of the supply chamber, wherein the orifice has a cross dimension that is substantially less than a cross dimension of the supply chamber for providing a fluid constriction. The cavitation generating chamber further comprises an expansion chamber positioned downstream of the orifice and a chamber outlet positioned downstream of the expansion chamber.

In one embodiment, the cavitation generating chamber further comprises an outlet channel positioned between the first expansion chamber and the chamber outlet, wherein the outlet channel comprises a substantially constant cross dimension.

In yet another embodiment, the cavitation generating chamber further comprises at least one second expansion chamber positioned between the first expansion chamber and the chamber outlet. The at least one second expansion chamber, for example, may comprise at least one second angle of expansion that is greater than the first angle of expansion. Alternatively, the at least one second expansion chamber may comprise at least one second angle of expansion that is less than the first angle of expansion.

In another embodiment, the cavitation generating chamber further comprises a chamber entry channel positioned between the orifice and the first expansion chamber. The length of the chamber entry channel may be sized such that a cross dimension of a fluid jet expands downstream of the vena contracta to be substantially equal to a cross dimension of the chamber entry channel. In another embodiment, the length of the chamber entry channel may be substantially equal to a cross dimension of the orifice. In yet another embodiment, the chamber entry channel comprises a substantially constant cross dimension.

According to another aspect of the invention, a method of treating a liquid comprises the steps of directing a fluid from a supply chamber into a cavitation generating chamber by constricting the fluid through an orifice, wherein the orifice is positioned within the cavitation generating chamber and the orifice has a cross dimension that is substantially less than a cross dimension of the supply chamber, such that a fluid jet is formed. The method further includes allowing the fluid jet to expand downstream of the orifice such that the velocity of the fluid is reduced so that the jet axial velocity head at the chamber outlet is less than the difference between the static pressure within the discharge chamber and the vapor pressure of the fluid. The method also includes discharging the fluid into a discharge chamber via a chamber outlet.

In another embodiment, the method further comprises the step of directing the fluid jet to approach the chamber wall such that fluid hammer pressure waves are generated due to a sudden change in velocity.

In yet another embodiment, the method further comprises the step of reflecting a portion of the fluid hammer pressure waves at or near at least one of the orifice and the chamber outlet such that the frequency of the pressure waves increases. In one embodiment a substantially large cross sectional area ratio may be provided at the chamber outlet. In another embodiment a substantially large cross sectional area ratio may be provided at the orifice.

In another embodiment, the method further comprises the step of increasing the frequency of the fluid hammer pressure wave. In yet another embodiment, the method further comprises the step of using the reflected energy of the pressure waves to increase the intensity of subsequent bubble collapses.

In another embodiment, the step of constricting the fluid through an orifice comprises constricting the fluid through an orifice defined by a sharp edge. Alternatively, the step of constricting the fluid through an orifice may comprise constricting the fluid through an orifice defined by a rounded edge.

In another embodiment, the step of allowing the fluid jet to expand comprises allowing the fluid to expand at an angle of expansion that is substantially equal to or less than a natural angle of expansion of an immersed turbulent fluid jet.

In still another embodiment, the step of allowing the fluid jet to expand comprises allowing the jet to expand at an angle of expansion that is substantially shallow such that the static pressure within the expansion chamber may be greater than the vapor pressure of the fluid to prevent continuous formation of cavitation bubbles within the expansion chamber. In yet another embodiment, the method further comprises the step of directing the fluid through an outlet channel upstream of the chamber outlet, wherein the outlet channel comprises a substantially constant cross dimension.

In another embodiment, the method further comprises the step of generating cavitation bubbles within the fluid during the low pressure phase of the pressure wave. In yet another embodiment, the method further comprises the step of collapsing the cavitation bubbles within the fluid during the high pressure phase of the pressure wave.

In accordance with another aspect of the invention, a liquid treatment apparatus comprises a supply chamber for receiving a fluid, a discharge chamber for discharging the fluid, and a cavitation generating chamber extending from a position on the supply chamber to a position on the discharge chamber for providing a fluid path therebetween. The cavitation generating chamber is operable to generate cavitation bubbles. The cavitation generating chamber comprises an orifice positioned substantially at the supply chamber such that the orifice communicates directly with the supply chamber, wherein the orifice has a cross dimension that is substantially less than a cross dimension of the supply chamber for providing a fluid constriction. The cavitation generating chamber further comprises a first expansion chamber positioned downstream of the orifice and a chamber outlet positioned downstream of the expansion chamber.

In another embodiment, a cross dimension of the supply chamber is substantially greater than a cross dimension of the orifice to provide reflection at the orifice of pressure waves generated within the cavitation generating chamber. For example, the cross dimension of the supply chamber may be at least twice the cross dimension of the orifice. Similarly, in another embodiment a cross dimension of the discharge chamber is substantially greater than a cross dimension of the chamber outlet to provide reflection at the chamber outlet of pressure waves generated within the cavitation generating chamber. For example, the cross dimension of the supply chamber may be at least twice the cross dimension of the chamber outlet. By reflecting the pressure waves at the orifice and/or chamber outlet, a significant portion of the energy is retained within the device. This energy can be utilized to increase the intensity of cloud cavitation bubble collapse within the device. In one embodiment, the cross dimension of the supply chamber is at least twice the cross dimension of the orifice.

In yet another embodiment, the first expansion chamber comprises a first angle of expansion that is substantially equal to or less than a natural angle of expansion of an immersed turbulent fluid jet. In one embodiment, the first expansion chamber comprises a first angle of expansion that is not less than about 10 degrees. For example, the first expansion chamber may comprise a first angle of expansion that is substantially equal to about 20 degrees. Alternatively, the first expansion chamber may comprise a first angle of expansion that is substantially equal to about 30 degrees.

In one embodiment, the cavitation generating chamber further comprises an outlet channel positioned between the first expansion chamber and the chamber outlet, wherein the outlet channel comprises a substantially constant cross dimension. In another embodiment, the cavitation generating chamber further comprises a chamber entry channel positioned between the orifice and the first expansion chamber.

BRIEF DESCRIPTION OF THE DRAWINGS

The accompanying drawings, which are incorporated in and constitute a part of this specification, illustrate embodiments of the invention and, together with a general description of the invention given above, and the detailed description below, serve to explain the invention.

FIGS. 4A-4E are schematic views of exemplary alternative cavitation generating chambers.

DETAILED DESCRIPTION

Figure 1:
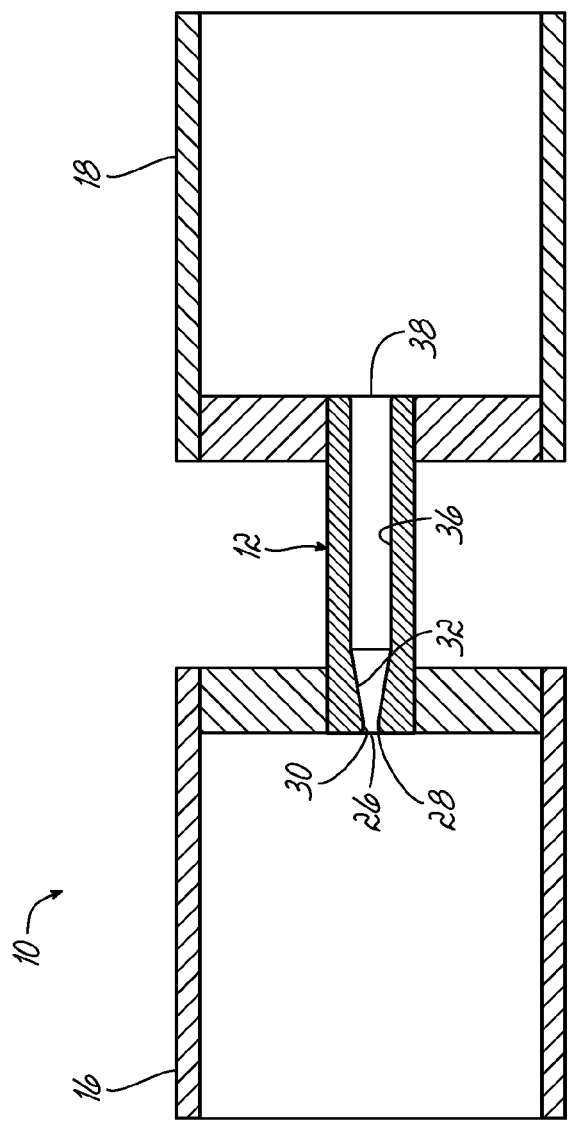
FIG. 1 is a schematic view of an exemplary pulse cavitation processor in accordance with the present invention.

One approach to increase the efficiency of bubble collapse is to force the cavitation bubbles to collapse sequentially in collective groups or "clouds." It is believed that this will increase the localized temperatures and pressures that occur during bubble collapse. This may be done, for example, by generating high amplitude, high frequency pressure waves and by utilizing these waves to generate high pressure differentials around and across the bubbles. The low pressure phase of the pressure waves may, for example, generate a cloud of bubbles such that the differential pressure applied to the bubbles by the following high pressure phase of the pressure wave will tend to cause the bubbles to collapse in the direction of the pressure wave travel. The energy from these bubble collapses will be added to the original pressure wave, increasing its amplitude. This will tend to increase the pressures generated by successive bubble collapses. It will also tend to increase the velocity of the bubble walls relative to one another during collapse, which will tend to increase the amplitude of the pressure wave.

In accordance with an exemplary embodiment of the invention, an increase in the efficiency of cavitation bubble collapse may be achieved using a self-exciting pulse cavitation processor that utilizes pressure waves generated as a result of fluid flow velocity variations to first generate cavitation bubble clouds, then to induce cavitation bubble cloud collapse, and finally, retains a large portion of the bubble cloud collapse energy within the cavitation generating chamber to increase subsequent bubble cloud collapse energy. In reference to FIGS. 1 and 1A, a pulse cavitation processor 10 includes a cavitation generating chamber 12 for generating and collapsing cavitation bubbles.

During cavitation bubble cloud collapse, some of the pressure wave energy is converted to heat, increasing the random velocity of heated molecules. Some of the pressure wave energy is utilized in the formation of high velocity micro-jets. Energy not thus consumed is reflected from the inlet and outlet ends of the cavitation generating chamber 12 in the form of pressure waves, to oscillate within the cavitation generating chamber 12. The frequency of reflected waves is a function of the speed of sound within the fluid and the inside diameter of the inlet/outlet and is independent of the frequency of the original pressure wave. In this manner, low frequency fluid hammer pressure waves may be converted to multiple higher frequency pressure waves. This serves to increase the differential pressure across individual bubbles prior to collapse. During formation of the subsequent cavitation bubble cloud, some of the energy of these waves is absorbed by the bubbles, resulting in an increase in internal temperature and in volume. This serves to increase energy released during subsequent cavitation bubble cloud collapse. In this manner, not only is the energy from the collapse added to the pressure wave, but the rate of pressurizing also increases until the system reaches a steady state. As will be described herein, a sudden increase in the diameter of a flow channel upstream and/or downstream of the cavitation generating chamber 12 could be utilized to accomplish the reflection of pressure wave energy.

In one embodiment, the cavitation generating chamber 12 may be constructed separately from the pulse cavitation processor 10 and inserted therein, or the cavitation generating chamber may be fully integrated during the formation of the processor 10. In either case, the cavitation generating chamber 12 extends between a supply chamber 16 and a discharge chamber 18 of the pulse cavitation processor 10. Together, the supply chamber 16, cavitation generating chamber 12, and discharge chamber 18 provide a fluid flow channel. During operation, a fluid enters the supply chamber 16 and passes through an orifice 26 into cavitation generating chamber 12. As discussed below, the resulting reduction in diameter of the fluid flow path at the orifice 26 can provide a reflection point to retain pressure wave energy within the cavitation generating chamber 12, helping to amplify flow velocity oscillations. Fluid enters the cavitation generating chamber 12, where cavitation bubble cloud formation and collapse occur, and is then deposited into the discharge chamber 18 via a chamber outlet. Cavitation bubble cloud collapse may occur almost entirely within the cavitation generating chamber 12.

Figure 1A:
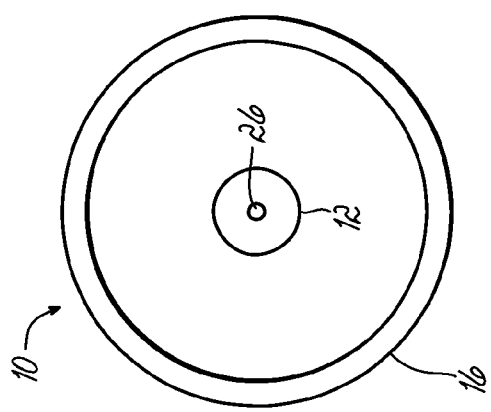
FIG. 1A is a cross sectional view of the pulse cavitation processor of FIG. 1.
Figure 2:
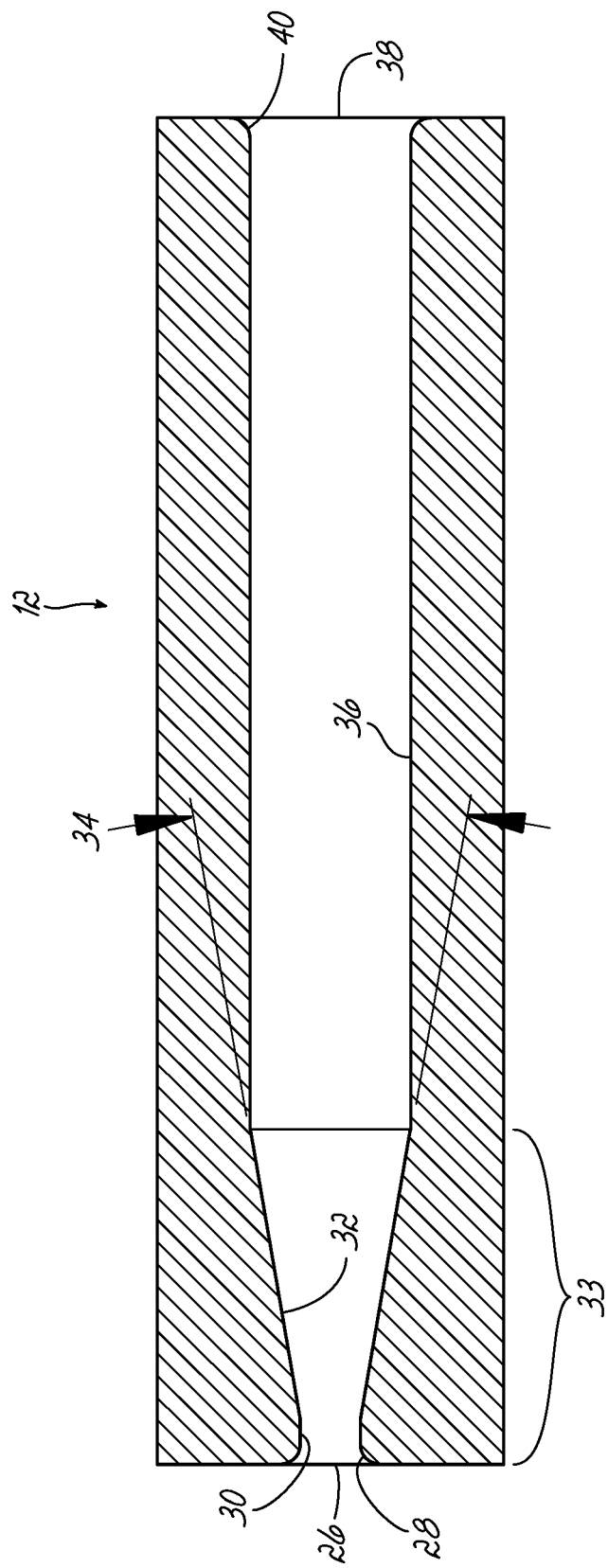
FIG. 2 is a schematic view of the cavitation generating chamber shown in FIG. 1.

Referring now to FIG. 2, with continued reference to FIGS. 1 and 1A, an exemplary cavitation generating chamber 12 in accordance with an embodiment of the present invention is shown schematically. The cavitation generating chamber 12 includes an orifice 26 having a diameter that is substantially less than the diameter of the supply chamber 16 of the pulse cavitation processor 10 such that the orifice provides a constriction for a fluid passing therethrough. Preferably, the diameter of the supply chamber 16 may be at least twice the diameter of the orifice 26. By way of example, particularly in applications involving water, the supply chamber 16 may have a diameter that is about four times the diameter of the orifice 26. Preferably, the supply chamber 16, orifice 26, and discharge chamber 18 are substantially concentric. In one embodiment, the cavitation generating chamber 12 includes a rounded edge 28 at the orifice 26 to provide a gradual constriction for the fluid. However, other embodiments may feature a sharp edge to provide a very abrupt constriction for the fluid. The diameter of the orifice 26 may be selected based on the desired flow rate and operating pressure for a working fluid, as well as additional operating conditions (e.g. an orifice 26 may have a diameter large enough to pass particulate matter contained in the working fluid to prevent plugging). For example, an orifice 26 having a diameter of about 6 mm has been found to work well with water at a desired operating velocity head of 2-4 bar.

A chamber entry channel 30 having a substantially constant diameter extends from the orifice 26 toward an expansion chamber 32 of the cavitation generating chamber 12. Together, the chamber entry channel 30 and the expansion chamber 32 collectively form a nozzle 33 and are operable to very effectively utilize the velocity head of a fluid to generate recirculation flow while minimizing the generation of cavitation bubbles due to high localized shear rates. Preferably, the geometry of the nozzle 33 is designed so that the absolute pressure therein may be maintained significantly above the vapor pressure of a fluid passing therethrough with optimum reverse flow of the fluid. (Note that if the pressure within the entire cavitation generating chamber 12 falls below the vapor pressure of the fluid, excessive energy may be utilized to generate cavitation bubbles, reducing fluid pressure wave energy, thus reducing effectiveness of the processor 10). In one embodiment, the length of the chamber entry channel 30 is selected so that the diameter of a fluid passing through the orifice 26 may expand downstream of the vena contracta to be substantially equal to the diameter of the chamber entry channel 30. For example, in one embodiment, the length of the chamber entry channel 30 may be about equal to the diameter of the orifice 26. In this manner, the chamber entry channel 30 may be provided to allow a fluid passing through the orifice 26 to recover from the sudden constriction caused by the orifice 26 and gradually conform to the angle of expansion 34 of the expansion chamber 32. An angle of expansion 34 that is too steep will exceed the expansion angle of the jet, providing space around the jet wherein cavitation bubbles may form due to excessive shear, resulting in reduced fluid hammer pressure wave energy; an angle of expansion 34 that is too small will result in insufficient recirculation flow which in turn will reduce inlet flow velocity variation which will reduce fluid hammer pressure wave amplitude and energy. Therefore, in an exemplary embodiment in applications involving water at room temperature, an expansion angle 34 of about 20 degrees (e.g. 10 degrees on each side of a longitudinal axis of the expansion chamber 32 when viewed schematically) has been found to provide excellent performance when supply pressure is on the order of about 4 Bars absolute and discharge pressure is on the order of about 1 Bar absolute. A slightly larger expansion angle 34 could be utilized, for example an angle of about 24-28 degrees, for applications involving water at room temperature with slightly lower supply-discharge pressure differential. Likewise, a smaller expansion angle 34 may also be utilized for applications with slightly higher supply-discharge pressure differential. An angle of expansion that is substantially equal to or slightly less than a natural angle of expansion of a turbulent fluid jet immersed in a fluid of substantially the same density, i.e. approximately 11.8 degrees per side (or approximately 23.6 degrees overall) may also be preferred;

at this angle, the Reynolds number of an immersed jet may vary little with distance from the origin. Therefore, while numerous configurations may be conceived within the scope of the invention, bubble collapse intensity may be less than that produced by the embodiments described herein.

Cavitation generating chamber 12 may further include an outlet channel 36 positioned downstream of the expansion chamber 32. Furthermore, cavitation generating chamber 12 may include a chamber outlet 38 positioned downstream of the expansion chamber 32. Chamber outlet 38 may be defined by round edges 40. Alternatively, chamber outlet 38 may be defined by sharp edges (not shown).

Figure 3:
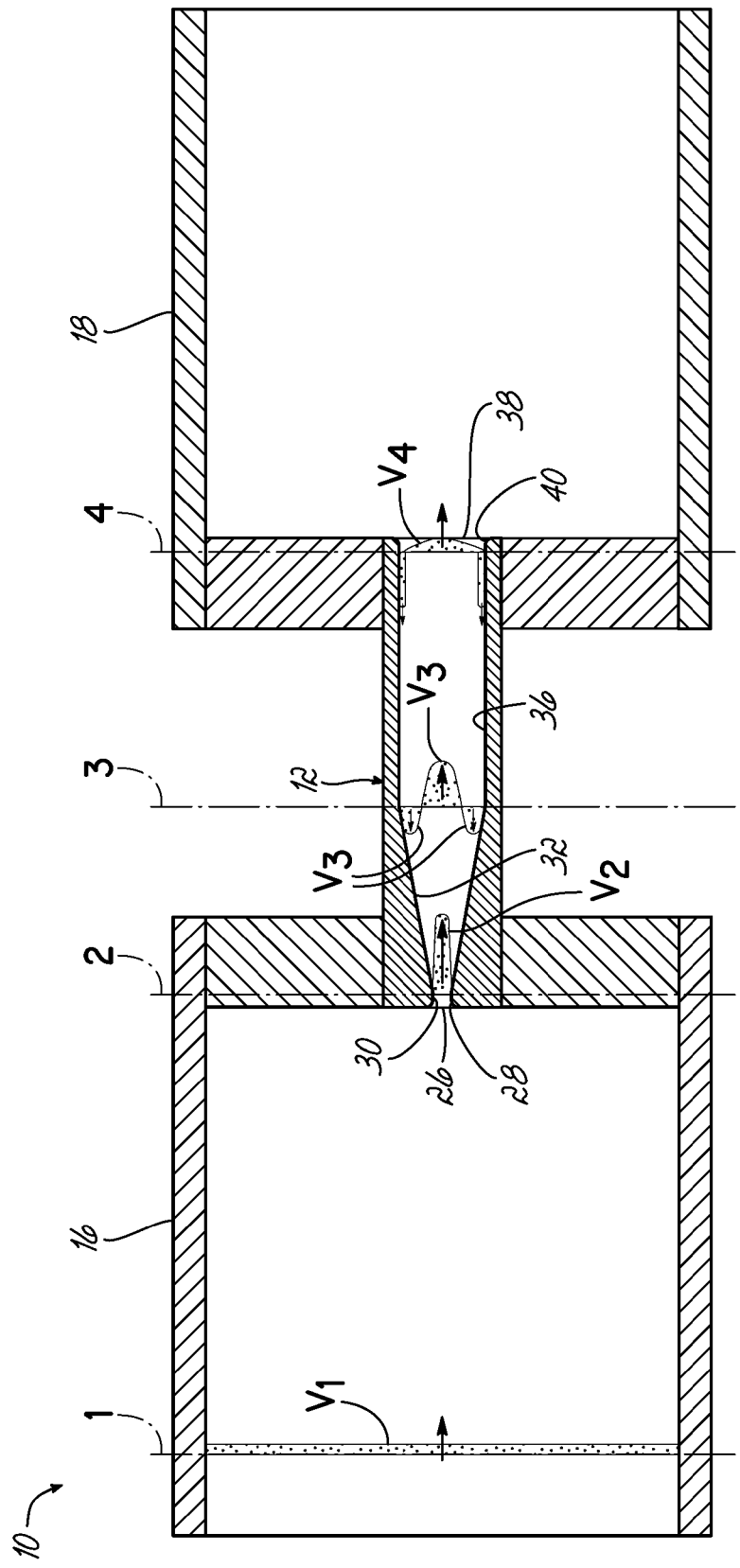
FIG. 3 is a schematic view of the pulse cavitation processor of FIG. 1, further depicting illustrative representations of a fluid velocity profile.

Referring now to FIG. 3, with continued reference to FIGS. 1, 1A, and 2, illustrative representations of axial fluid velocity profiles $v_1$, $v_2$, $v_3$, $v_4$ within a pulse cavitation processor 10 as a fluid jet approaches the outlet 38 of a cavitation generating chamber 12 are provided. As the fluid jet passes through the orifice 26, the velocity profile may change rapidly from $v_1$ at position 1 to $v_2$ shown at position 2. Note that at position 2, velocity profile $v_2$ may approach zero at the wall of the cavitation generating chamber 12. Flow velocity at position 2 may be maximized at the center of the inlet jet, and there may be substantially no recirculation flow. As the fluid jet moves through the expansion chamber 32, some of the surrounding fluid may be entrained within the jet, increasing the fluid jet's diameter. The resulting transfer of momentum to the surrounding fluid may cause a reduction in main jet axial velocity. To replace fluid entrained within the jet, a portion of fluid may flow in the opposing direction (i.e. from the discharge chamber 18 toward the orifice 26), resulting in recirculation flow. The axial momentum reduction may vary with the angle of expansion 34 of expansion chamber 32 approximately in accordance with the formula:

$$VHL = 0.175 + 0.775 \times [(\alpha - 10)/30]$$

where VHL=velocity head loss within the expansion chamber as a fraction of the theoretical difference in inlet and outlet velocity heads and where α=the full cone angle in degrees (i.e. 2× the angle between one side and the axis) of expansion chamber 32. (This formula has been developed using the graph presented on page 227 of "FLUID MECHANICS WITH ENGINEERING APPLICATIONS" by Robert L Daugherty and Joseph B. Franzini, Sixth edition, published by McGraw-Hill Book Company, Library of Congress Catalog Card Number 65-19084.)

A minimum value of α is approximately 8 degrees with fluids having viscosities similar to water, but a minimum of 10 degrees may be recommended for stability. Note that as the value of α is decreased, the amplitude of the flow velocity variations is decreased, decreasing pressure wave amplitude.

The maximum value of α to avoid continuous cavitation cannot be calculated as a standalone value, as it is only one of several factors influencing the static pressure within the cavitation generator. In general, increasing the value of α increases the risk of continuous cavitation. Once the supply pressure, inlet and outlet diameters, discharge pressure, vapor pressure and an initial value of α have been determined or selected, the minimum operating pressure within the cavitation generator can be calculated. The value of α can then be adjusted to achieve optimal static pressure.

Pulse cavitation may be achieved with lower inlet velocity head and hence with reduced energy consumption at lower values of α.

As the fluid jet continues to expand beyond the end of the expansion chamber 32 at position 3 due to fluid entrainment, the annular area between the jet and the inner wall of the outlet channel 36 may be reduced. At the same time, as more fluid is entrained, the recirculation flow rate may increase, as illustrated by velocity profile $v_3$. By adjusting the length of the cavitation generating chamber 12 and the expansion angle 34 of the expansion chamber 32, it is possible to adjust the amount of fluid entrained by the jet within the cavitation generating chamber 12. Moreover, by adjusting the diameter of the chamber outlet 38, it is possible to adjust the velocity of the recirculation flow, and hence the momentum transfer to the jet. If at the point when the jet reaches the chamber outlet 38 the suddenly increasing momentum transfer to the recirculation flow approaches the initial jet momentum, flow may temporarily slow or even stop, thus generating a fluid hammer pressure wave.

At position 4, fluid velocity profile $v_4$ represents that the centerline axial velocity of the out flowing jet may be substantially equal to or less than twice the mean jet velocity. (Note that centerline velocity and centerline to mean jet velocity ratio may be influenced by the expansion angle 34 of expansion chamber 32.) This may be partially achieved by adjusting the length of outlet chamber 36 such that the length of the cavitation generating chamber 12 may be substantially equal to approximately 17-18 times the diameter of the orifice 26. It may be desired that this velocity be low enough so that the centerline velocity head may be equal to or less than the difference between the absolute static head in the discharge chamber 18 and the vapor pressure of the fluid.

Maximum head available to induce recirculation flow may be equal to the difference between the absolute static head in the discharge chamber 18 and the vapor pressure of the fluid. However, actual recirculation flow velocity may likely vary at different stages of the inlet jet velocity pulse, due to variations in inlet velocity, various losses and pressure wave interactions.

At or near the point when the momentum transfer from the inlet jet to the recirculation flow is substantially equal to the initial inlet jet momentum, the inlet jet velocity may be reduced to at or near zero. (This sudden increase in recirculation flow may occur very rapidly due to a rapidly increasing pressure pulse as the jet approaches the outlet 38 of the cavitation generating chamber 12 and may last for only a very short time.)

According to an exemplary embodiment of the invention, wherein an orifice 26 having rounded a rounded edge 28 communicates directly with an expansion chamber 32, the following sequence of steps may be used to calculate the design parameters of a trial pulse cavitation processor 10. It should be appreciated that the design parameters of a pulse cavitation processor may be ascertained using a variety of alternative methods in accordance with the present invention.

The first step is to determine the fluid characteristics including specific gravity and vapor pressure at the proposed operating temperature.

The next step is to determine the discharge pressure under operating conditions.

The next step is to determine desired inlet head.

The next step is to select trial inlet and outlet diameters. First, choose whichever diameter is most important. Next, calculate the other diameter so that the inlet to outlet diameter ratio is approximately equal to the (outlet pressure−vapor pressure)/(inlet pressure−outlet pressure).

The next step is to calculate the inlet to outlet velocity ratio (inversely proportional to square of diameters)

The next step is to calculate the inlet loss factor as a function of the inlet velocity head.

The next step is to select the expansion angle 34 of expansion chamber 32 and to calculate the expansion chamber loss factor (or find it in published literature) as a function of the inlet velocity head.

The next step is to calculate the exit loss factor as a function of the inlet velocity head and the mean exit velocity head.

The next step is to calculate the combined loss factor.

The next step is to calculate the effective inlet velocity head.

The next step is to calculate the inlet velocity.

The next step is to calculate the mean exit velocity (based upon inlet to outlet area ratio and inlet velocity).

The next step is to calculate the mean exit velocity head using the formula head=velocity squared/2/g, where g is the gravitational constant.

The next step is to calculate the absolute pressure within the interior of the cavitation generating chamber 12. This pressure differential is generated by jet molecules impinging upon the surrounding molecules within the cavitation generating chamber 12, tending to accelerate them towards the discharge. This tends to reduce the pressure upon the walls of the cavitation generating chamber 12, particularly within the expansion chamber 32. The mean absolute pressure=(the absolute outlet pressure×the outlet area−the outlet velocity head×the outlet area−the net absolute inlet head×inlet area)/(outlet area−inlet area).

The next step is to verify that the resulting static pressure within the cavitation generator does not drop below the vapor pressure of the fluid.

It is important to note that the absolute pressure calculated is not the lowest absolute pressure achieved during the suddenly occurring deceleration pulse that initiates fluid hammer. At that point in time, the absolute pressure within the chamber typically drops below the vapor pressure of the fluid and some of the kinetic energy of the fluid is utilized to generate a sudden cloud of cavitation bubbles throughout the interior of the cavitation generator.

Variations in fluid viscosity and the amount of gas entrainment may require design parameter variations for optimum performance.

A rounded discharge will tend to increase pressure wave amplitude for a given set of other design parameters when the discharge is submerged.

The next step is to calculate a trial cavitation generator length from the orifice 26 to the chamber outlet 38. The trial length will be selected as 18 times the inlet diameter. After optimization it may approach 17 times the inlet diameter. Other values may also be possible through optimization.

Referring again specifically to FIG. 1, the diameter of the outlet channel 36 is sized such that the cross sectional area ratio between the interior of the discharge chamber 18 and the outlet channel 36 is relatively large. This large cross sectional area ratio provides a sudden increase in the flow channel area downstream of the orifice 26 which causes pressure wave energy within outlet channel 36 to reflect at or near the chamber outlet 38. In addition, a relatively large cross sectional area ratio between the interior of the supply chamber 16 and the orifice 26 provides a sudden increase in diameter of the flow channel upstream of the orifice 26, which causes pressure wave energy within the cavitation generating chamber 12 to reflect at or near the orifice 26, thereby retaining energy within the cavitation generating chamber 12. As has been described, a significant benefit of the sudden expansions in the inlet and outlet flow channels at the orifice 26 and chamber outlet 38, respectively, is the reflection of pressure wave energy such that much of the energy of a previous cavitation cloud collapse and water hammer pressure wave energy due to inlet flow velocity variations are retained within the cavitation generating chamber 12 and are utilized to increase the intensity of a subsequent cavitation cloud collapse. Higher area ratios at the orifice 26 and chamber outlet 38 will provide increased pressure wave energy reflection. To this end, the diameter of the interior of the supply chamber 16 is preferably at least twice the diameter of the orifice 26, and the diameter of the interior of the discharge chamber 18 is preferably at least twice the diameter of the chamber outlet 38. In applications where the fluid is water, in an exemplary embodiment, the diameters of the interiors of the supply and discharge chambers 16, 18 may each be about six times the diameters of the orifice 26 and chamber outlet 38, respectively.

According to one embodiment, assuming a diameter ratio of about 6 at the inlet and outlet, about 35/36 of the energy of each pressure wave is reflected at the orifice 26 and chamber outlet 38 and retained within the cavitation generating chamber 12, while only about 1/36 of the energy escapes into the supply and discharge chambers 16, 18 to be ineffectively utilized to heat the fluid. It should be noted that the pressure wave amplitudes will increase until a steady state is achieved (whereat pressure wave amplitudes and frequencies may be substantially consistent) such that the pressure wave energy gain with each cycle matches the energy radiated at the orifice and chamber outlet. Thus, as the area ratio is increased, the pressure wave amplitudes increase to maintain energy balance. It should be noted that residual pressure wave energy is only a fraction of the initial fluid energy. Much of the initial fluid energy is absorbed during the formation, oscillation and collapse of the cavitation bubbles. It should also be noted that energy reflection is not directly related to the area ratio. Flow channel configuration variations (e.g. rounded edges at the orifice and chamber outlet) and variations in density and speed of sound of the fluid on either side of the flow area discontinuities (i.e. the orifice and chamber outlet) will tend to affect energy reflection.

Generation of pressure waves causes bubble collapse times to be relatively short compared to collapse times in the absence of pressure waves, so that the frequencies of pressure pulses generated by individual bubble collapse during cloud collapse are relatively high. Because the frequencies are high, the velocity of micro-jets formed during the asymmetrical bubble collapse which occurs during cavitation bubble cloud collapse is also high. This results in higher shear rates and better penetration of the jets into particulate matter or microorganisms they may encounter. Furthermore, because the pressure waves generated by cavitation cloud collapse tend to travel parallel to the walls of the processor 10, micro-jets formed during cavitation cloud collapse within the processor 10 tend to travel parallel to the walls. This will tend to reduce damage to the walls by micro-jet impingement.

Figure 4C:
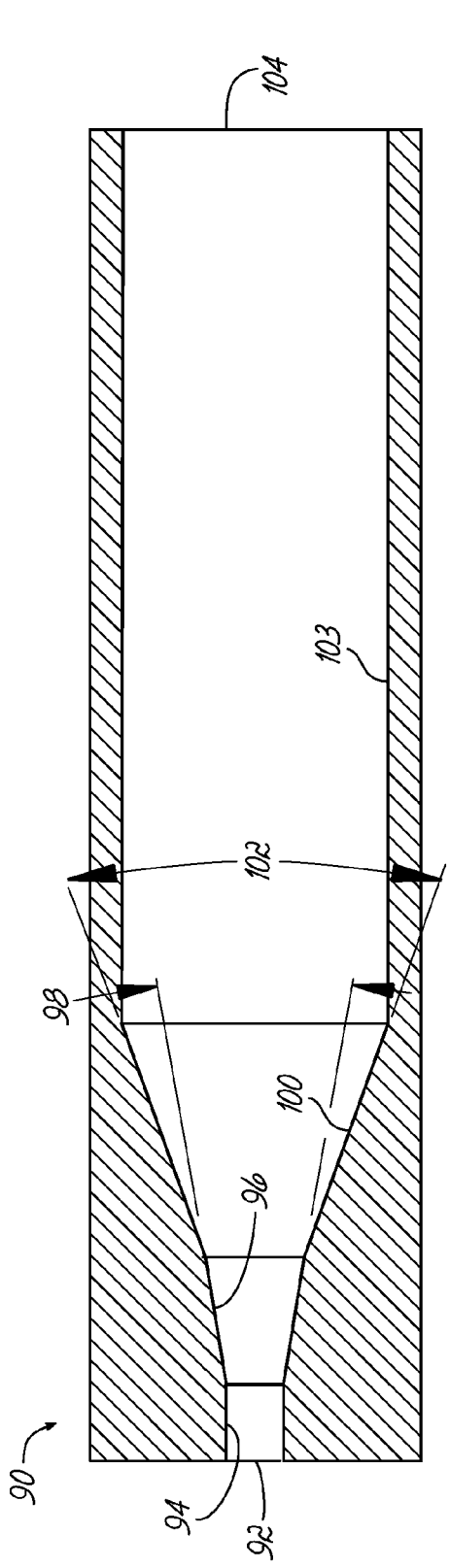

Referring now to FIGS. 4A-4E, a variety of exemplary cavitation generating chambers in accordance with the present invention are shown for illustrative purposes. Referring specifically to FIG. 4A, an alternative cavitation generating chamber 42 in accordance with the present invention is shown schematically. The cavitation generating chamber 42 includes an orifice 58 having a diameter that is substantially less than the diameter of the supply chamber of a pulse cavitation processor (not shown) such that the orifice 58 provides a constriction for a fluid passing therethrough. The diameter of the orifice 58 may be selected as previously described with reference to FIGS. 1 and 2. Preferably, the orifice 58 is positioned substantially concentric with a supply chamber and a discharge chamber (not shown). In one embodiment, the cavitation generating chamber 42 includes a sharp edge 60 at the orifice 58 to provide a very abrupt constriction for the fluid. A chamber entry channel 62 extends from the orifice 58 toward an expansion chamber 64 of the cavitation generating chamber 42. Together, the chamber entry channel 62 and the expansion chamber 64 form a nozzle 65. Preferably, the geometry of the nozzle 65 is designed so that the absolute pressure therein may be maintained greater than the vapor pressure of a fluid passing therein. The angle of expansion 66 of the expansion chamber 64 may be selected as previously described in reference to FIGS. 1 and 2. As shown in FIG. 4A, an outlet channel 67 may be positioned downstream of the expansion chamber 64. Outlet channel 67 may comprise a substantially constant diameter and may terminate at the chamber outlet 68 of the cavitation generating chamber 42.

As shown in FIG. 4B, a cavitation generating chamber 70 may include an orifice 72, a chamber entry channel 74 having a constant diameter, and a first expansion chamber 76 comprising a first angle of expansion 78, as previously described in reference to FIG. 2. The cavitation generating chamber 70 may further include a second expansion chamber 80 extending downstream of the first expansion chamber 76, wherein the second expansion chamber 80 comprises a second angle of expansion 82 that is different from the first angle of expansion 78. For example, the second angle of expansion 82 may be less than the first angle of expansion 78. An outlet channel 83 having a substantially constant diameter may be provided at the downstream terminus of the second expansion chamber 80. Moreover, chamber outlet 84 may be provided at the downstream terminus of the outlet channel 83. Similarly, as shown in FIG. 4C, a cavitation generating chamber 90 may include an orifice 92, a chamber entry channel 94 having a constant diameter, and a first expansion chamber 96 comprising a first angle of expansion 98, as previously described herein. The cavitation generating chamber 90 may further include a second expansion chamber 100 extending downstream of the first expansion chamber 96, wherein the second expansion chamber 100 comprises a second angle of expansion 102 that is different from the first angle of expansion 98. For example, the second expansion chamber 100 may comprise a second angle of expansion 102 that is greater than the first angle of expansion 98. An outlet channel 103 having a substantially constant diameter is provided at the downstream terminus of the second expansion chamber 100, and a chamber outlet 104 is provided at the downstream terminus of the outlet channel. Other embodiments may include additional expansion chambers comprising various angles of expansion, as may be desired.

Figure 4D:
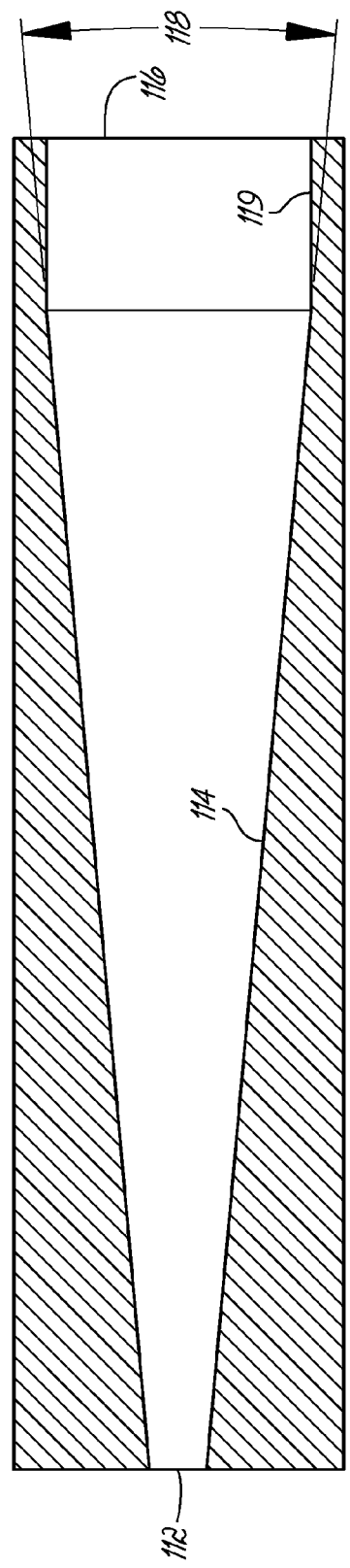

As shown in FIG. 4D, a cavitation generating chamber 110 may comprise an orifice 112, an expansion chamber 114, an outlet channel 119, and a chamber outlet 116. The expansion chamber 114 may comprise an angle of expansion 118 as previously described with reference to FIG. 2. Notably, the cavitation generating chamber 110 does not include a chamber entry channel as has been previously described. Rather, the orifice 112 may communicate directly with the expansion chamber 114.

Figure 4E:
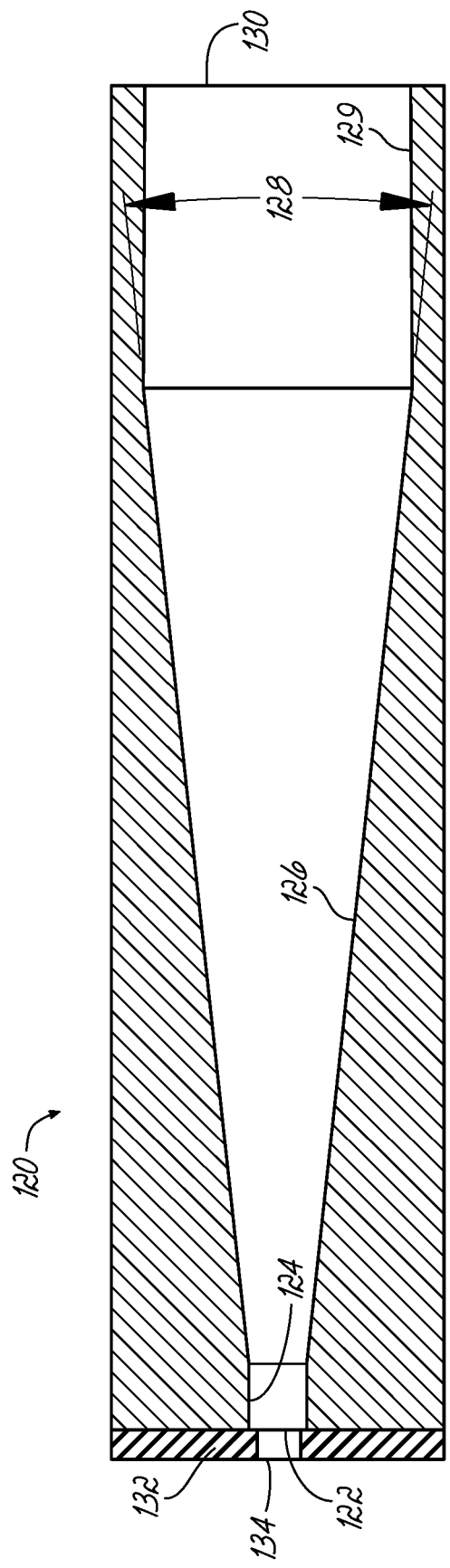

In one embodiment of the present invention, it may be desirable to prevent excessive wear and damage to the device caused by fluid flow. For example, as shown in FIG. 4E, a cavitation generating chamber 120 may include an orifice 122, a chamber entry channel 124 having a constant diameter, an expansion chamber 126 comprising an angle of expansion 128, an outlet channel 129, and a chamber outlet 130, similar to that previously described with respect to FIG. 4A. A wear insert 132 having an annulus 134 may be positioned adjacent the orifice 122 to allow fluid to flow therethrough while protecting the surface of the orifice from the potentially damaging impact of the fluid flow. The wear insert 132 may be replaceable and may comprise, for example, a carbide-based material.

According to another embodiment of the present invention, a plurality of pulse cavitation processors may be installed in parallel to operate within a common chamber. For example, a second cavitation generating chamber (not shown), substantially similar to cavitation generating chamber 12 may be installed between supply chamber 16 and discharge chamber 18 in an orientation parallel to cavitation generating chamber 12 (FIG. 1). It should be noted that, in order to optimize performance, the same inlet and outlet area ratios should be maintained. In an exemplary embodiment, the areas of the interior of the supply chamber 16 and the interior of the discharge chamber 18 may be doubled when a second cavitation generating chamber having an orifice and a chamber outlet of diameters substantially equal to the diameters of the orifice and chamber outlet of cavitation generating chamber 12 is installed between the supply and discharge chambers 16, 18 in an orientation parallel to cavitation generating chamber 12.

According to yet another embodiment of the present invention, a plurality of pulse cavitation processors may be positioned circumferentially about an inner cylindrical chamber and may extend radially outward to an outer cylindrical chamber. The inner and outer cylindrical chambers may be substantially concentric. In one embodiment, the inner cylindrical chamber may be a supply chamber and the outer cylindrical chamber may be a discharge chamber. Alternatively, the inner cylindrical chamber may be a discharge chamber and the outer cylindrical chamber may be a supply chamber.

In one embodiment of the present invention, a pulse cavitation processor is oriented such that the pulse cavitation processor may discharge upward directly into a gas (e.g. air) so that the discharge may remain full of the working fluid as the discharge is above the surface of the surrounding liquid. Such a configuration would provide a reflection coefficient in excess of 0.999, if water were to be the working fluid. Therefore, more than 99.9% of the energy of each pressure wave would be reflected at the chamber outlet of the processor to be retained for further utilization within the cavitation generating chamber. This would result in higher pressures and temperatures during subsequent bubble collapse cycles.

Aspects of the invention as described herein may be beneficial to a variety of industrial applications that rely on chemical reactions to achieve an end product. In particular, through the intensification of cavitation bubble collapse provided by a pulse cavitation processor, chemical reactions may be enhanced. For example, it is believed that the chemical reactions may be accelerated potentially by orders of magnitude as compared to rates typically achieved without cavitation in a conventional stirred batch reactor.

The ability to convert a batch type of chemical reaction into a continuous reaction has many benefits. For example, a continuous reaction provides improved quality control. In this regard, maintaining batch-to-batch consistency is often difficult and problematic. Continuous reactions, on the other hand, promote consistent quality upon maintaining the appropriate operating parameters. Additionally, continuous reactions are less susceptible to side chain reactions that may diminish quality. Thermal energy can be continuously transferred between inlet and outlet streams permitting optimum temperature control with minimal wasted energy. Still further, in continuous chemical reactions the amount of process tank volume is typically significantly reduced. This in turn, may provide for reduced inventory and capital costs. Moreover, in various food processes, reduced tank volumes reduce the risk of product contamination and continuous reactions reduce residence time for the growth of contaminating microorganisms.

In addition to these, there may be other benefits. For example, it is believed that chemical consumption will be reduced when using a pulse cavitation processor for many process applications. In this regard, it is believed that the increased efficiency in collapsing the cavitation bubbles (and the resulting increases in pressure, temperature and micro-jet induced shear) will require a lesser amount of chemical to achieve a similar result in the treated liquid. It may also result in the presence of a lessor quantity of salts generated during neutralization of unreacted chemicals. Less chemical consumption provides for cost savings in the chemical themselves and may further reduce costs associated with handling of the chemicals either before or after treatment of a liquid. For example, in some applications post chemical treatment processes may constitute a major portion of the costs of a manufacturing process.

It should be noted that the increased frequency of the reflected fluid hammer pressure waves can be significant. For example, in smaller devices it has been determined that the frequency of the original fluid hammer pressure wave may be lower than 200 hertz whereas the frequency of the reflected waves can exceed 600 kilohertz. This may increase the pressure differential across the bubbles by a factor of greater than 1000. This dramatic frequency increase, coupled with the fact that the pressure wave amplitude generated by fluid hammer is typically greater than ten times the amplitude generated by ultrasonic cavitation devices, the resulting pressure differential is typically more than 10,000 times greater. The difference may be even greater when compared to other hydrodynamic cavitation devices.

EXAMPLE

Utilizing FIG. 3 as a reference, the following example may increase understanding of the process. It should be appreciated that the exemplary calculations, assumptions and values are not limiting, but rather may be modified to suit a particular application in accordance with the present invention. Assume the working fluid is water with a specific gravity of 1 and a vapor pressure at the desired operating temperature of 0.02 Bars absolute. Further, assume the discharge pressure is 1.12 Bars absolute. Next, assume that the inlet head is 3 Bars gage. Finally, assume that the total expansion angle $\alpha$ of the expansion chamber 32 is 20 degrees.

The trial inlet and outlet diameters may now be selected. Assume that the desired inlet diameter is 8 millimeters. The trial outlet diameter can be calculated as $8\times(3+1-1.12)/(1.12-0.2)=21$ mm.

The inlet velocity to outlet velocity ratio=$(21/8)^2=6.9$

The inlet loss factor as a ratio of inlet velocity head, based upon the use of a smoothly rounded inlet, can be found in literature to be 0.04.

The expansion chamber loss factor, again as a ratio of inlet velocity head can be calculated based upon the expansion angle and the inlet and outlet velocity ratios as loss factor=$[0.175+0.775\times(\alpha-10)/30]\times[\{(\text{outlet diameter})^2-(\text{inlet diameter})^2\}/(\text{outlet diameter})^2]$. If $\alpha=20$, inlet diameter=8 mm and outlet diameter=21 mm, the expansion section loss factor becomes=$[0.175+0.775\times(20-10)/30]\times[\{(21)^2-(8)^2\}/(21)^2]=0.4333\times0.855=0.37$.

The mean exit velocity as a ratio of the inlet velocity head=$(\text{inlet diameter/outlet diameter})^2=(8/21)^2=0.145$.

The total loss factor=$0.04+0.37+0.145=0.555$.

The effective inlet velocity head becomes $(3+1-1.12)=2.8$ Bars. With water, 2.8 Bars pressure is the equivalent of $2.8\,\text{Bars}\times(100,000\,\text{newton/meter}^2)/(9,800\,\text{newton/meter}^3)=28.57$ meters velocity head.

Utilizing the formula: velocity=$(\text{velocity head}\times2\times g)^{0.5}$ where $g=9.8$ meters/sec$^2$ the inlet velocity=$(28.57\,\text{meters}\times2\times9.8\,\text{meters/sec}^2)^{0.5}=23.66$ meters/sec.

The mean exit velocity becomes $23.66\,\text{meters/sec}\times(8/21)^2=3.43$ meters/sec.

The exit velocity head=$3.43^2/2/9.8=0.6$ meters.

The inlet pressure drop=inlet loss factor$\times$inlet velocity head=$0.04\times28.57$ meters=$1.14$ meters. Thus, the net inlet head becomes $40.8-1.14=39.66$ meters. The absolute pressure within the cavitation generator=(the absolute outlet pressure$\times$the outlet area-the outlet velocity head$\times$the outlet area-the net absolute inlet head$\times$inlet area)/(outlet area-inlet area). The inlet pressure=4 Bars absolute=$4\times(100,000\,\text{newton/meter}^2)/(9,800\,\text{newton/meter}^3)=40.8$ meters. The absolute discharge pressure=$1.12\,\text{Bars}=1.12\times(100,000\,\text{newton/meter}^2)/(9,800\,\text{newton/meter}^3)=11.4$ meters. The absolute pressure within the device becomes $(11.4\,\text{meters}\times21^2/4\times3.14159\,\text{square meters}-0.6\,\text{meters}\times21^2/4\times3.14159\,\text{square meters}-39.66\,\text{meters}\times8^2/4\times3.14159\,\text{square meters})/(21^2/4\times3.14159\,\text{square meters}-8^2/4\times3.14159\,\text{square meters})=5.9$ meters. Note that this is well above the vapor pressure of the fluid which is $0.02\,\text{Bars}=0.02\times(100,000\,\text{newton/meter}^2)/(9,800\,\text{newton/meter}^3)=0.2$ meters.

The length of the trial cavitation generator from the orifice to the chamber outlet=18 times the orifice diameter=$18\times8=144$ millimeter.

A device with similar dimensions, operating with water at room temperature generated pressure waves with amplitudes exceeding 20 Bar and frequencies in the order of 235 kilohertz. The resulting pressure rise rate was in in excess of 18.8 million Bar/sec.

The diameter of supply chamber 16 can be selected as the desired multiple of a diameter of the orifice 26. This diameter can be as little as 2$\times$ the diameter of orifice 26 but it is recommended that the diameter of supply chamber 16 be at least 2$\times$ the diameter of the chamber outlet 38.

Similarly, the diameter of discharge chamber 18 should be selected to be at least 2$\times$ the diameter of the chamber outlet 38.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in numerous combinations depending on the needs and preferences of the user. There may be many variations of the design parameters which may be preferred, and the combination to be used will depend on preferences of the end user (e.g. pump performance parameters). Thus, alternative design parameters and methods of selecting design parameters may be used without departing from the spirit and scope of the present invention.

What is claimed is:

1. A liquid treatment apparatus, comprising:
a supply chamber for receiving a fluid;
a discharge chamber for discharging the fluid; and
a cavitation generating chamber extending from the supply chamber to the discharge chamber for providing a fluid flow path therebetween, wherein the cavitation generating chamber is operable to generate cavitation bubbles, the cavitation generating chamber comprising:
a non-adjustable orifice positioned downstream of the supply chamber, the orifice having a fixed cross dimension that is substantially less than a cross dimension of the supply chamber for providing a fluid constriction;
a first expansion chamber positioned downstream of the orifice; and
a chamber outlet positioned downstream of the expansion chamber, wherein a cross dimension of the supply chamber is at least twice the fixed cross dimension of the orifice to provide reflection at or near the orifice of pressure waves generated within the cavitation generating chamber and a cross dimension of the discharge chamber is at least twice the cross dimension of the chamber outlet to provide reflection at the chamber outlet of pressure waves generated within the cavitation generating chamber.

2. The liquid treatment apparatus of claim 1, wherein the first expansion chamber comprises a first angle of expansion that is substantially equal to or less than a natural angle of expansion of a turbulent fluid jet immersed in a fluid of substantially the same density, wherein the fluid includes water.

3. The liquid treatment apparatus of claim 1, wherein the first expansion chamber comprises a first angle of expansion that is not less than about 10 degrees.

4. The liquid treatment apparatus of claim 3, wherein the first angle of expansion is substantially equal to about 20 degrees or about 30 degrees.

5. The liquid treatment apparatus of claim 1, further comprising at least one second cavitation generating chamber situated in parallel to the cavitation generating chamber and extending from the supply chamber to the discharge chamber for providing a second fluid flow path therebetween, wherein the at least one second cavitation generating chamber is operable to generate cavitation bubbles, the second cavitation generating chamber comprising:
an orifice positioned downstream of the supply chamber, the orifice having a cross dimension that is substantially less than a cross dimension of the supply chamber for providing a fluid constriction;
an expansion chamber positioned downstream of the orifice; and
a chamber outlet positioned downstream of the expansion chamber.

6. The liquid treatment apparatus of claim 1, wherein the cavitation generating chamber further comprises an outlet channel positioned between the first expansion chamber and the chamber outlet, wherein the outlet channel comprises a substantially constant cross dimension.

7. The liquid treatment apparatus of claim 1, wherein the cavitation generating chamber further comprises at least one second expansion chamber positioned between the first expansion chamber and the chamber outlet.

8. The liquid treatment apparatus of claim 7, wherein the at least one second expansion chamber comprises at least one second angle of expansion that is different from the first angle of expansion.

9. The liquid treatment apparatus of claim 1, wherein the cavitation generating chamber further comprises a chamber entry channel positioned between the orifice and the first expansion chamber.

10. The liquid treatment apparatus of claim 9, wherein a length of the chamber entry channel is sized such that a cross dimension of a fluid expands downstream of the vena contracta to be substantially equal to a cross dimension of the chamber entry channel, and wherein the fluid includes water.

11. The liquid treatment apparatus of claim 9, wherein a length of the chamber entry channel is substantially equal to the fixed cross dimension of the orifice.

12. The liquid treatment apparatus of claim 9, wherein the chamber entry channel comprises a substantially constant cross dimension.

13. A liquid treatment apparatus, comprising:
a supply chamber for receiving a fluid;
a discharge chamber for discharging the fluid; and
a cavitation generating chamber extending from the supply chamber to the discharge chamber for providing a fluid flow path therebetween, wherein the cavitation generating chamber is operable to generate cavitation bubbles, the cavitation generating chamber comprising:
a non-adjustable orifice positioned downstream of the supply chamber, the orifice having a fixed cross dimension that is substantially less than a cross dimension of the supply chamber for providing a fluid constriction;
a first expansion chamber positioned downstream of the orifice; and
a chamber outlet positioned downstream of the expansion chamber,
wherein the first expansion chamber tapers outwardly in a direction towards an outlet channel, which is positioned between the first expansion chamber and the chamber outlet and which has a substantially constant cross dimension.

* * * * *